United States Patent
McWilliams

(10) Patent No.: US 6,592,170 B2
(45) Date of Patent: Jul. 15, 2003

(54) BOTTOM RAIL FOR VEHICLE TRAILER

(75) Inventor: Cliff McWilliams, Katy, TX (US)

(73) Assignee: Vantage Dump Trailers, Inc., Katy, TX (US)

(*) Notice: Subject to any disclaimer, the term of this patent is extended or adjusted under 35 U.S.C. 154(b) by 0 days.

(21) Appl. No.: 10/016,417

(22) Filed: Dec. 10, 2001

(65) Prior Publication Data

US 2003/0107238 A1 Jun. 12, 2003

(51) Int. Cl.[7] .............................................. B62D 33/04
(52) U.S. Cl. ........................................ 296/181; 296/29
(58) Field of Search ............................... 296/181, 183, 296/184, 29; 105/396, 404

(56) References Cited

U.S. PATENT DOCUMENTS

| | | | |
|---|---|---|---|
| 3,156,503 A | * 11/1964 | Chieger | 296/181 |
| 3,393,920 A | * 7/1968 | Ehrlich | 296/181 |
| 3,480,321 A | 11/1969 | Brandt et al. | 296/28 |
| 3,729,230 A | 4/1973 | Tomlinson, Jr. et al. | 298/7 |
| 4,021,074 A | 5/1977 | Heiser | 298/22 |
| 4,437,699 A | * 3/1984 | Lewis et al. | 296/181 |
| 4,498,264 A | * 2/1985 | McCafferty et al. | 296/181 X |
| 4,527,826 A | 7/1985 | O'Neal | 296/3 |
| 4,883,321 A | 11/1989 | Voigt | 298/17.7 |
| 4,969,690 A | 11/1990 | Smith | 298/17 |
| 5,005,893 A | 4/1991 | McCrary | 296/21 |
| 5,090,773 A | 2/1992 | Guillaume | 298/17 |
| 5,195,800 A | * 3/1993 | Stafford et al. | 296/181 |
| 5,421,476 A | 6/1995 | Matias | 220/470 |
| 5,454,620 A | 10/1995 | Hill et al. | 296/184 |
| 5,460,431 A | 10/1995 | McWilliams | 298/22 |
| 5,542,563 A | 8/1996 | Matias | 220/470 |
| 5,551,759 A | 9/1996 | Hoss et al. | 298/22 |
| 5,660,446 A | 8/1997 | Weatherly | 298/8 |
| 5,741,042 A | * 4/1998 | Livingston et al. | 296/181 X |
| 5,769,478 A | * 6/1998 | Vernese | 296/181 X |
| 5,772,276 A | * 6/1998 | Fetz et al. | 296/181 |
| 6,138,578 A | 10/2000 | Cowan, Jr. et al. | 105/355 |
| 6,206,476 B1 | 3/2001 | Welton | 298/1 |

* cited by examiner

Primary Examiner—Joseph D. Pape
(74) Attorney, Agent, or Firm—Head, Johnson & Kachigian

(57) ABSTRACT

A bottom rail for a vehicle trailer. The bottom rail includes a floor leg extending parallel to and abutting a floor of the trailer. A cross member cover extends perpendicular from the floor leg. An upstanding member extends perpendicular to the floor leg. The upstanding member terminates in a notch spaced away from the floor leg for receiving a sidewall therein, wherein the upstanding member is thicker than the sidewall.

12 Claims, 3 Drawing Sheets

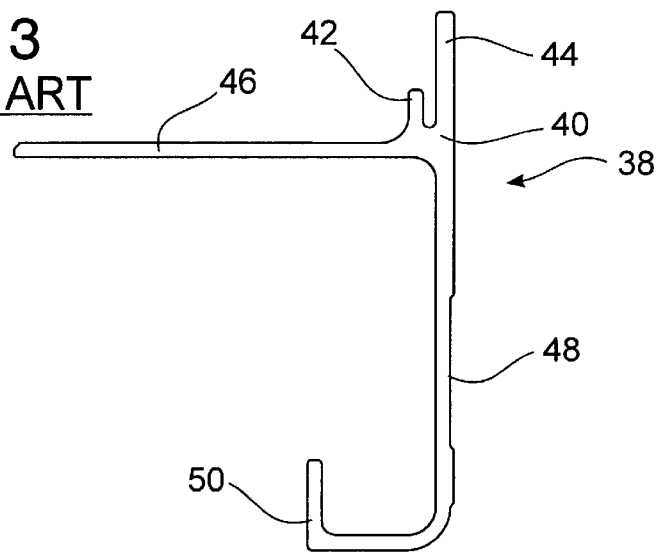
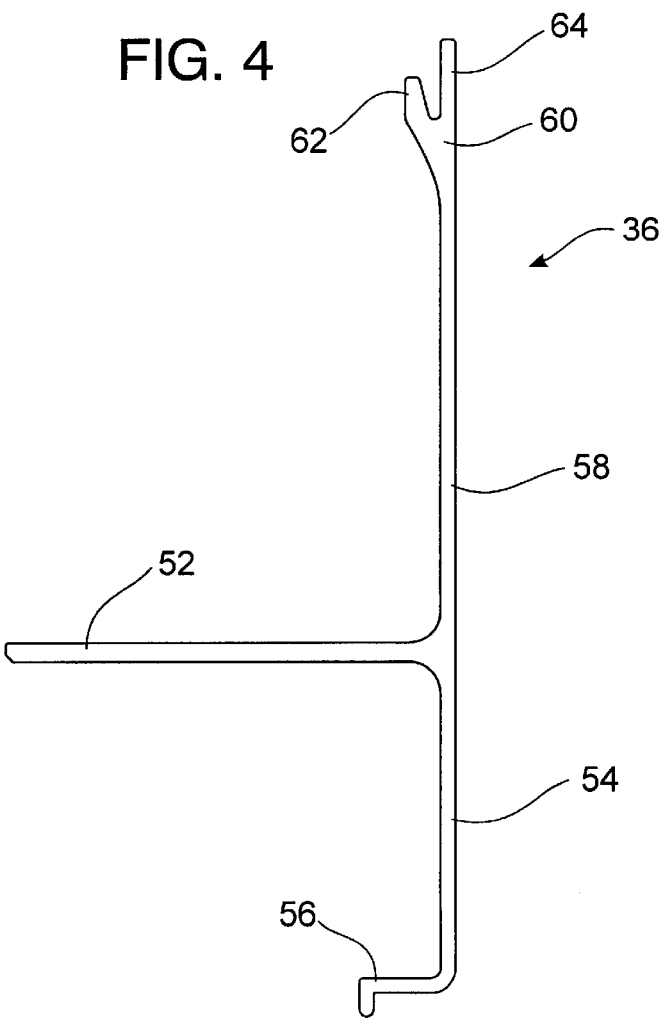

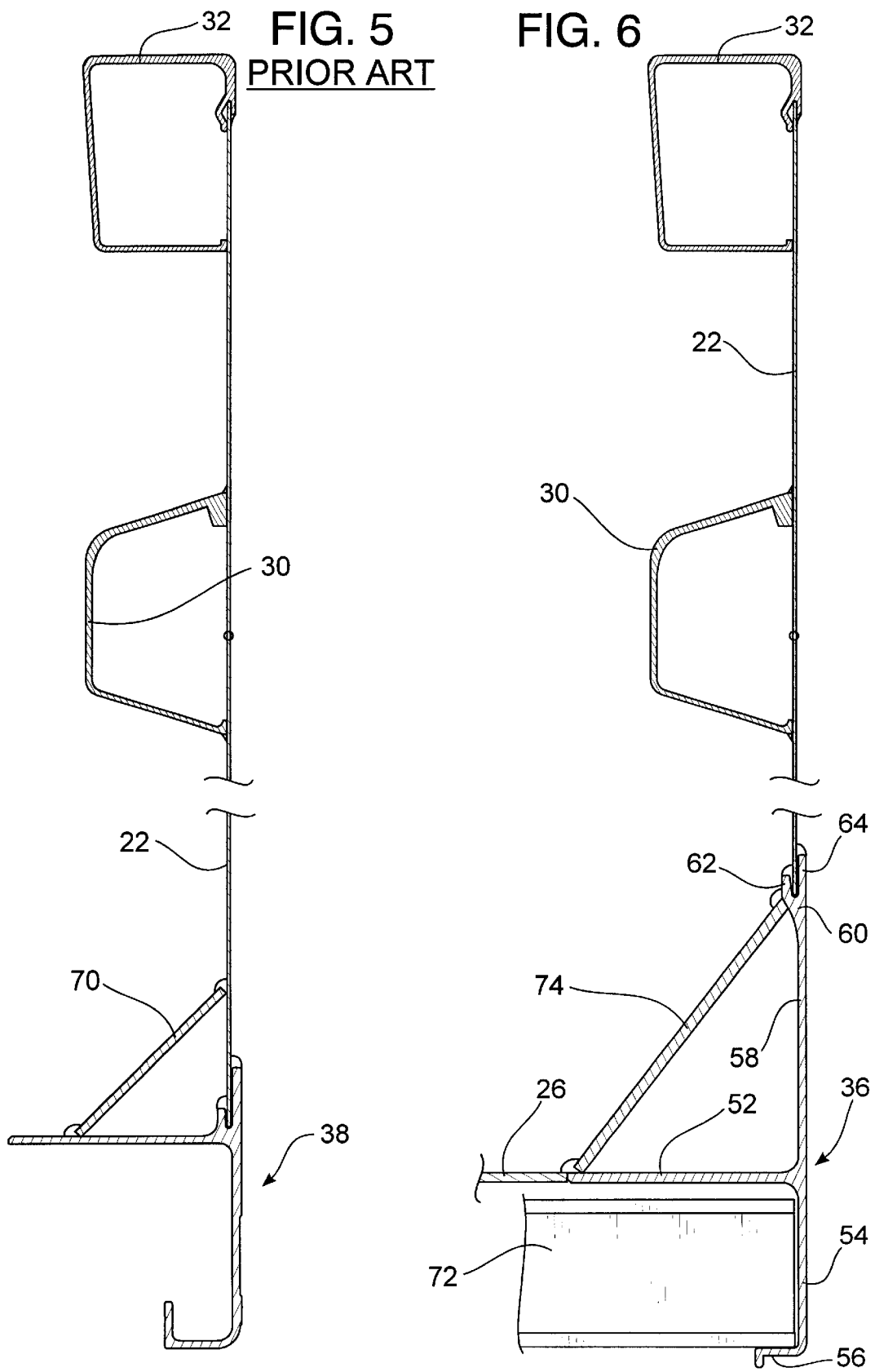

BOTTOM RAIL FOR VEHICLE TRAILER

BACKGROUND OF THE INVENTION

1. Field of the Invention

The present invention relates to a bottom rail for a trailer vehicle. In particular, the present invention relates to a bottom rail for a trailer vehicle which will have superior wear and strength characteristics over existing, known designs and also relates to a method to manufacture a trailer having a bottom rail.

2. Prior Art

Trailers for vehicles such as tractor trailers used to transport loads will typically include at least a floor, a pair of opposed sidewalls, and a front. The trailers may also include a removable or swinging tail gate at the rear. The trailers may take various configurations including dump trailers, tipper trailers and other designs. During unloading, the trailer is tilted so that the force of gravity will allow the load to slide out of the rear. When loose materials are delivered, such as rocks or dirt, wear results on the floor and on the sidewalls.

In many cases, it is desirable to minimize the weight of the trailer while maximizing the strength and wear characteristics of the trailer.

In fabricating metal trailers, it has often been the practice to weld a flat metal sheet or sheets used as sidewalls to a base or bottom rail which extends the length of the trailer. The bottom rail, thus, joins the floor to the sidewall and also serves as structural support for the trailer. A weld is often made on both the outside and inside where the side sheet meets the bottom rail at the floor line.

In use over time, the trailer is subject to significant vertical and horizontal stresses from traveling on roadways and from loading and unloading of trailers. It has been found that the welding or weldings at the base or floor line causes a heat affected zone at the intersection of the bottom rail where the sidewall is attached and which provides less strength. Accordingly, eliminating the welds at the floor line where the side sheet meets would be highly desirable.

The interior weld or welds are also subject to wear over time when the trailer is unloaded. Accordingly, it has been found necessary to include a wear plate which extends between the floor and the sidewall. The wear plate prevents wear on the interior welds. The wear plate, however, adds additional weight and additional cost to the trailer. Accordingly, it is desirable to design a trailer wherein the wear plate is no longer required but is optional.

Additionally, it is desirable from both a cost and weight standpoint to design a trailer having sheet walls with minimum thickness. At the same time, the lower portion of the sidewalls are subject to wear due to conditions caused during unloading the trailer. Accordingly, it is desirable to maximize the wear capability of the sidewalls while minimizing the costs and the weight of the sidewalls. Accordingly, one goal of the present invention is to provide a sidewall with a thicker portion at the base near the floor line than elsewhere.

Moreover, it would be desirable to construct each of the sidewalls of the trailer from a single large sheet, such as sheets of aluminum stored on large rolls, so that the width of the sheet is wide enough for the desired sidewall height. By way of example and not limitation, the maximum width of a sheet might be 96", while the height of the sidewall could be 102" or 103". Accordingly, a further goal of the present invention is to design a trailer where sidewalls may be constructed from a single large sheet.

SUMMARY OF THE INVENTION

The present invention pertains to a bottom rail for a vehicle trailer. The trailer includes a right sidewall and a left sidewall generally opposed to each other. Extending between the sidewalls is a generally flat floor for supporting a load thereon. The floor extends the length of the trailer from the front to the rear of the trailer.

The trailer also includes a front wall extending between the sidewalls and the floor.

Extending the entire length of the trailer from the front to the rear are a pair of bottom rails. A bottom rail is located at the juncture of each of the sidewalls and the floor. The bottom rail includes an extending floor leg which would be generally parallel to the floor of the trailer. A cross member cover extends generally perpendicular from the floor leg. As an optional feature, the cross member cover may terminate in a reinforcing turn up.

The bottom rail also includes an upstanding member which extends upward from the floor leg. The upstanding member terminates in a notch which is spaced away from the floor leg, more than 1 inch above the floor line. The notch is designed for receiving a sidewall therein. The notch includes an inner finger and an outer finger of different lengths. The inner finger and the outer finger are not parallel to each other but are at an acute angle to each other. The sidewall is welded to the upstanding member of the bottom rail at the notch. The thickness of the upstanding member is significantly thicker than the sidewall.

BRIEF DESCRIPTION OF THE DRAWINGS

FIG. 3 is a side view of a bottom rail for a vehicle trailer as known in the prior art;

FIG. 4 is a side view of a bottom rail for a vehicle trailer constructed in accordance with the present invention;

FIG. 5 illustrates a sectional view of a bottom rail and sidewall in the prior art; and FIG. 6 illustrates a bottom rail and sidewall in sectional view in accordance with the present invention.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
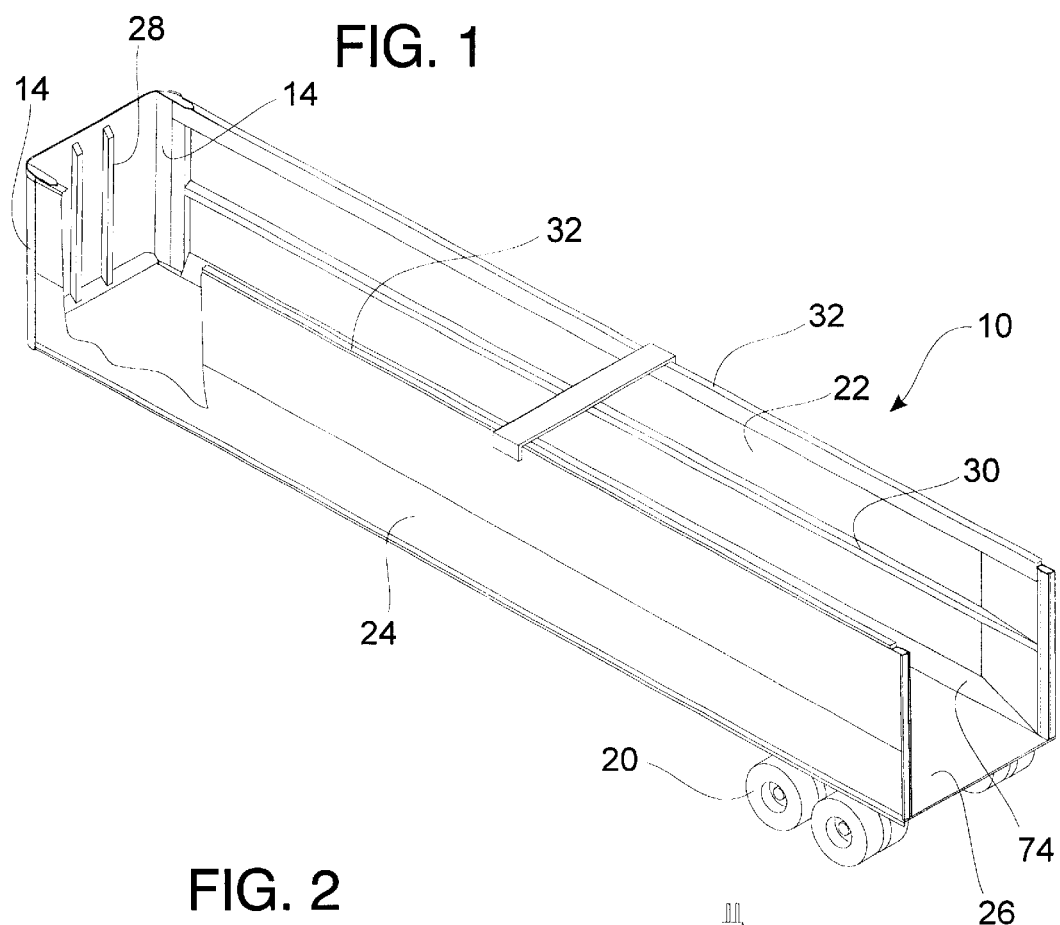
FIG. 1 is a perspective view taken from above and to the side of a trailer with a portion cutaway which incorporates the teachings of the present invention.
Figure 2:
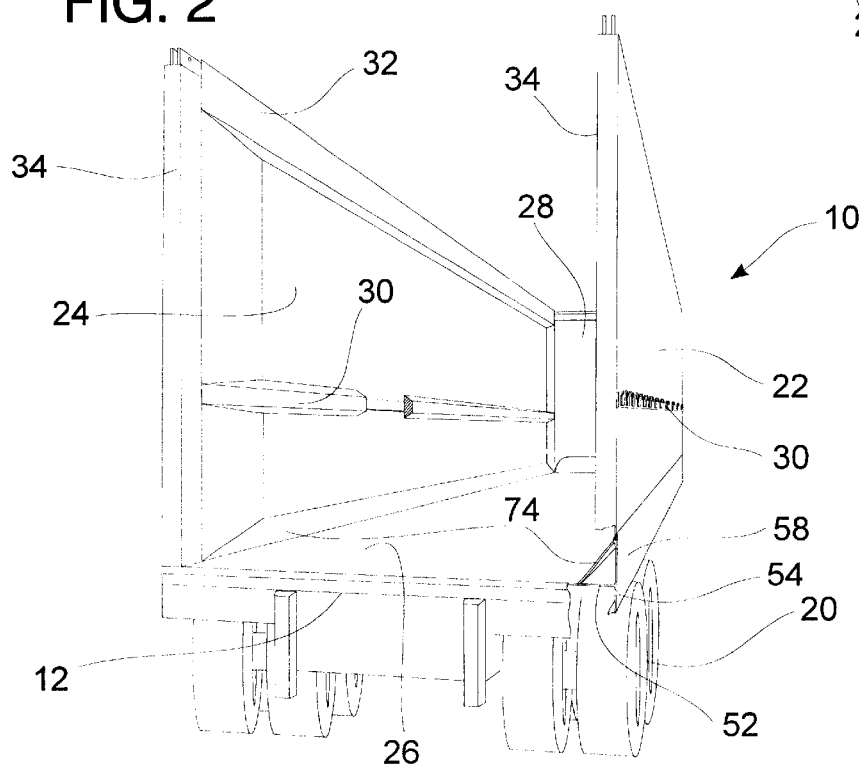
FIG. 2 is a perspective view of the trailer shown in FIG. 1 taken from the rear of the trailer.

Referring to the drawings in detail, FIG. 1 is a perspective view taken from above and to the side of a tipper trailer 10, shown unloaded. FIG. 2 is a perspective view of the trailer shown in FIG. 1 taken generally from the rear of the trailer 10. A tail gate has been removed for ease of viewing.

The trailer may be built to various dimensions. In one embodiment, the trailer has a rated carrying capacity of up to 49 yards and up to 80,000 pounds. The present invention is shown in FIGS. 1 and 2 with a tipper trailer but it will be recognized that the invention may be used with various types of vehicle trailers.

The tipper trailer 10 may be supported by a plurality of rear wheels 20 and may be connected to a truck by a hitch (not seen).

The trailer 10 includes a right sidewall 22 and a left sidewall 24 opposed to each other. In FIGS. 1 and 2, the sidewalls are parallel to each other although other arrangements are possible. For example, the sidewall may be at an obtuse angle to the floor. In FIG. 1, the left sidewall 24 is partially cut away for ease of viewing. Extending between the sidewalls is a generally flat floor 26 for supporting a load thereon. The floor 26 extends the length of the trailer from the front to the rear of the trailer.

The trailer 10 also includes a front wall 28 extending between the sidewalls and the floor. The trailer 10 may also include front posts 14. The trailer may also include an upstanding back post 34 at the rear of each sidewall.

The trailer 10 shown in FIGS. 1 and 2 also includes at least one side rail 30 for each sidewall and a top rail 32 for each sidewall.

Extending the entire length of the trailer 10 from front to rear are a pair of bottom rails 36. A bottom rail 36 is located at the juncture of the sidewall 22 and floor 26. Likewise another bottom rail 36 is located at the juncture of sidewall 24 and floor 26.

FIG. 3 illustrates a side view of a bottom rail 38 existing in the prior art. A notch 40 is formed to receive a sidewall (not shown in FIG. 3). The notch 40 includes an inner finger 42 and an outer finger 44. The bottom rail 38 also includes a floor leg 46 which would be parallel to the floor of the trailer (not shown in FIG. 3). The bottom rail 38 also includes a cross member cover 48 which extends generally perpendicular from the floor leg. The cross member cover 48 may also include a turn up 50.

FIG. 4 illustrates a side view of the bottom rail 36 of the present invention apart from the trailer. The bottom rail 36 includes a floor leg 52 which would be generally parallel to the floor of the trailer 10 (not shown in FIG. 4). A cross member cover extends generally perpendicular from the floor leg 52. As an optional feature, the cross member cover 54 may terminate in a reinforcing turn down 56.

The bottom rail 36 also includes an upstanding member 58 which extends upward from the floor leg 52. In the embodiment shown in FIG. 4, the upstanding member 58 is generally perpendicular to the floor leg but may be set at an angle depending on the configuration of the trailer.

The upstanding member 58 terminates in a notch 60 which is spaced away from the floor leg 52. It has been found that the notch should be more than 1 inch above the floor line. The notch 60 is designed for receiving a sidewall therein. The notch 60 includes an inner finger 62 and an outer finger 64. The inner finger 62 and outer finger 64 are of different lengths. As will be seen, this is advantageous to assure that the welds are spaced away from each other. Additionally, the inner finger and outer finger are not parallel to each other but are at an acute angle. Accordingly, the notch will receive sidewalls of various thicknesses therein.

The bottom rail 36 for the left sidewall 24 would be a reverse image of that shown in FIG. 4.

FIG. 5 is a sectional view showing one example of a bottom rail 38 in usage in the prior art. Since the sidewall 22 is welded to the bottom rail at the floor level, the interior weld is subject to extreme wear from loading and unloading and the outside weld is subject to stresses from use on the roadways. Accordingly, it has been found that a wear plate 70 extending between the sidewall and bottom rail is mandatory.

FIG. 6 is a sectional view which illustrates the teachings of the present invention. The bottom rail 36 is shown connected to a sidewall 22. A side rail 30 and a top rail 32 are also shown. The floor leg 52 is shown abutting and aligned with the floor 26 of the trailer (only partially shown in FIG. 6). The sidewall 22 is welded to the upstanding member 58 of the bottom rail at the notch 60. The notch is spaced above and away from the level of the floor. It has been found that the notch should be more than 1 inch away from the level of the floor to avoid wear and stress issues. As seen in FIG. 6, the inner finger 62 is shorter and of a different length than the outer finger 64. Accordingly, the weld points on the inner side and the outer side are not at the same level.

The cross member cover 54 is seen in FIG. 6 in relation to a cross member 72.

An optional wear plate 74 has been employed in the embodiment shown in FIG. 6 although it is not required for either wear or stress issues.

It can be seen from FIG. 6 that the thickness of the upstanding member 58 is significantly thicker than the sidewall 22. By way of example but not limitation, the sidewall thickness might be 0.16 inch while the thickness of the upstanding member 58 might be 0.20 inch. Accordingly, the resulting sidewall is significantly thicker at the junction of the sidewall to the floor than elsewhere.

The trailer 10 may be fabricated by forming a bottom rail by extrusion, such as by extruding an aluminum alloy.

Each of the bottom rails may be welded to the floor by welding the floor leg to the floor. Thereafter, a sidewall may be inserted into the notch in the upstanding member of the bottom rail. A sidewall or a portion of a sidewall may be fabricated by cutting from a roll of sheet metal. Finally, the sidewall may be welded to the bottom rail at the notch by welding the sidewall to the inner finger and welding the sidewall to the outer finger.

Whereas, the present invention has been described in relation to the drawings attached hereto, it should be understood that other and further modifications, apart from those shown or suggested herein, may be made within the spirit and scope of this invention.

What is claimed is:

1. A bottom rail for a trailer, which bottom rail comprises:
 a floor leg parallel to a floor of said trailer, wherein said floor leg abuts said trailer floor;
 a cross member cover extending perpendicular from said floor leg;
 an upstanding member extending from said floor leg, wherein said upstanding member is significantly thicker than a sidewall; and
 said upstanding member terminating in a notch spaced from said floor leg for receiving said sidewall therein, wherein said notch has a width which tapers.

2. A bottom rail for a trailer as set forth in claim 1 wherein said cross member cover includes a reinforcing turn down.

3. A bottom rail for a trailer as set forth in claim 1 wherein said notch includes an inner finger and an outer finger.

4. A bottom rail for a trailer as set forth in claim 3 wherein said outer finger is longer than said inner finger.

5. A bottom rail for a trailer as set forth in claim 1 including a wear plate extending between said floor leg and said upstanding member.

6. A bottom rail for a trailer as set forth in claim 1 wherein said trailer has a length and said bottom rail extends the length of said trailer.

7. A bottom rail for a trailer as set forth in claim 1 wherein said upstanding member extends perpendicular to said floor leg.

8. A method to fabricate a trailer which comprises:
 forming a bottom rail having a floor leg, wherein said floor leg abuts said trailer floor, a cross member cover perpendicular to said floor leg, and an upstanding member perpendicular to said floor leg;
 welding a floor to said floor leg;
 inserting a sidewall into a notch in said upstanding member, wherein said upstanding member is significantly thicker than said sidewall, said notch spaced from said floor leg, wherein said notch has a width that tapers; and welding said sidewall to said notch.

9. A method to fabricate a trailer as set forth in claim 8 wherein welding of said side panel includes both interior and exterior welds.

10. A method to fabricate a trailer as set forth in claim 8 wherein the step of forming a bottom rail is accomplished by extrusion.

11. A method to fabricate a trailer as set forth in claim 10 wherein said step of extruding a bottom rail includes the step of extruding a notch in said upstanding member with an inner finger and an outer finger.

12. A bottom rail for a trailer as set forth in claim 1 wherein said upstanding member has an upper portion which forms a part of said sidewall.

\* \* \* \* \*